(12) United States Patent
Nakasako et al.

(10) Patent No.: US 10,259,422 B2
(45) Date of Patent: Apr. 16, 2019

(54) HOOD OF VEHICLE

(71) Applicants: MITSUBISHI JIDOSHA KOGYO KABUSHIKI KAISHA, Tokyo (JP); MITSUBISHI JIDOSHA ENGINEERING KABUSHIKI KAISHA, Okazaki-shi, Aichi (JP)

(72) Inventors: Makoto Nakasako, Okazaki (JP); Hidetaka Inagaki, Tokyo (JP); Yoshihiro Nakamura, Okazaki (JP)

(73) Assignees: MITSUBISHI JIDOSHA KOGYO KABUSHIKI KAISHA, Tokyo (JP); MITSUBISHI JIDOSHA ENGINEERING KABUSHIKI KAISHA, Okazaki-Shi, Aichi (JP)

( * ) Notice: Subject to any disclaimer, the term of this patent is extended or adjusted under 35 U.S.C. 154(b) by 0 days.

(21) Appl. No.: 15/699,552

(22) Filed: Sep. 8, 2017

(65) Prior Publication Data

US 2018/0072262 A1 Mar. 15, 2018

(30) Foreign Application Priority Data

Sep. 9, 2016 (JP) ................................. 2016-176282

(51) Int. Cl.
 *B62D 25/10* (2006.01)
 *B60R 21/34* (2011.01)
 *B62D 25/12* (2006.01)

(52) U.S. Cl.
 CPC ............ *B60R 21/34* (2013.01); *B62D 25/105* (2013.01); *B60R 2021/343* (2013.01); *B60Y 2200/91* (2013.01); *B62D 25/12* (2013.01)

(58) Field of Classification Search
 CPC ...... B62D 25/10; B62D 25/105; B62D 25/12; B60R 2021/343
 See application file for complete search history.

(56) References Cited

U.S. PATENT DOCUMENTS

| | | | |
|---|---|---|---|
| 7,488,031 B2 * | 2/2009 | Ishitobi | B60R 21/34 296/187.04 |
| 7,810,877 B2 * | 10/2010 | Ishitobi | B60R 21/34 180/69.2 |

(Continued)

FOREIGN PATENT DOCUMENTS

| | | | |
|---|---|---|---|
| EP | 2 305 540 A1 | 4/2011 | |
| EP | 2305540 A1 * | 4/2011 | ........... B62D 25/105 |

(Continued)

OTHER PUBLICATIONS

Extended European Search Report dated Jan. 29, 2018 issued in corresponding European Application No. 17189697.0.

*Primary Examiner* — Katy M Ebner
(74) *Attorney, Agent, or Firm* — Birch, Stewart, Kolasch & Birch, LLP (57) ABSTRACT

A vehicle hood structure includes a hood outer panel and a hood inner panel that is disposed at a back surface of the hood outer panel. In vehicle hood structure, the hood inner panel includes an outer peripheral frame that is arranged in an outer peripheral portion of the hood inner panel, a proximate surface that is arranged inside from the outer peripheral frame and is joined to the back surface of the outer panel, and a connection vertical wall that connects an inner peripheral vertical wall configuring an inner periphery of the outer peripheral frame and the proximate surface.

7 Claims, 4 Drawing Sheets

(56) References Cited

U.S. PATENT DOCUMENTS

| | | | | |
|---|---|---|---|---|
| 8,403,405 B2* | 3/2013 | Ikeda | ................... | B60R 21/34 |
| | | | | 296/187.04 |
| 8,662,571 B2* | 3/2014 | Grattan | ............... | B62D 25/105 |
| | | | | 180/69.2 |
| 9,027,987 B2* | 5/2015 | Ikeda | ................... | B62D 25/12 |
| | | | | 296/193.11 |
| 9,033,407 B2* | 5/2015 | Ikeda | ................... | B60R 21/34 |
| | | | | 296/187.04 |
| 9,150,256 B2* | 10/2015 | Yonezawa | ............... | B60R 21/34 |
| 9,340,235 B2* | 5/2016 | Kalargeros | ........... | B62D 25/105 |
| 9,387,887 B2* | 7/2016 | Ishitobi | ............... | B62D 25/105 |
| 9,533,715 B2* | 1/2017 | Inoue | ................ | B62D 25/105 |
| 9,868,472 B2* | 1/2018 | Takada | .................. | B60R 21/34 |
| 2016/0083019 A1 | 3/2016 | Takada et al. | | |
| 2017/0282977 A1* | 10/2017 | Kashima | ............... | B62D 25/12 |

FOREIGN PATENT DOCUMENTS

| | | | | |
|---|---|---|---|---|
| FR | 2 926 778 A1 | 7/2009 | | |
| FR | 2926778 B1 * | 4/2010 | ........... | B62D 25/105 |
| JP | 2013-1215 A | 1/2013 | | |
| JP | 2016-60396 A | 4/2016 | | |

* cited by examiner

HOOD OF VEHICLE

CROSS REFERENCE TO RELATED APPLICATION

This application is based on Japanese Patent Application No. 2016-176282 filed on Sep. 9, 2016, the contents of which are incorporated herein by reference.

BACKGROUND OF THE INVENTION

1. Technical Field

The present invention relates to a hood of a vehicle.

2. Background Art

A hood which opens and closes a front side compartment of a vehicle body includes a hood outer panel and a hood inner panel disposed at the back surface of the hood outer panel (see JP-A-2013-1215).

The hood inner panel includes an outer peripheral frame arranged in an outer peripheral portion of the hood inner panel, a proximate surface which is arranged inside from the outer peripheral frame to be joined to the back surface of the outer panel, and a connection vertical wall which connects an inner peripheral vertical wall configuring an inner periphery of the outer peripheral frame and the proximate surface.

The inner peripheral vertical wall and the connection vertical wall have a front-side vertical wall which extends in a vehicle width direction and connects the outer peripheral frame of the vehicle front-side portion and the proximate surface, and a lateral-side vertical wall which extends in a front and rear direction of the vehicle and connects the outer peripheral frame of the vehicle side portion and the proximate surface.

In a pedestrian protection performance test on the hood, an impact absorption performance is evaluated in such a manner that an impactor is moved to collide with the hood from the upper side of the vehicle in an oblique rear direction.

In a case where the load of the impactor is input to a portion of the hood outer panel above the front-side vertical wall, in consideration of an input direction of the load and an extending direction of the front-side vertical wall, the load is received by a surface of the front-side vertical wall. For this reason, the front-side vertical wall is easily deformed along the input direction of the load, and it is not difficult to obtain a required impact absorption performance.

On the other hand, in a case where the load of the impactor is input to a portion of the hood outer panel above the lateral-side vertical wall, in consideration of the input direction of the load and the extending direction of the lateral-side vertical wall, the load is received along the extending direction of the lateral-side vertical wall. The lateral-side vertical wall is hardly deformed along the input direction of the load, and it is not easy to obtain a required impact absorption performance.

Therefore, there is room for improvement in terms of improving the impact absorption performance in a case where the load of the impactor is input to the portion of the hood outer panel on the upper side of the lateral-side vertical wall.

The present invention has been made in consideration of the above situation, and an object thereof is to provide a hood of a vehicle which is advantageous in improving an impact absorption performance.

SUMMARY OF THE INVENTION (1) According to an aspect of the invention, a vehicle hood structure includes a hood outer panel and a hood inner panel that is disposed at a back surface of the hood outer panel. In the vehicle hood structure, the hood inner panel includes an outer peripheral frame that is arranged in an outer peripheral portion of the hood inner panel, a proximate surface that is arranged inside from the outer peripheral frame and is joined to the back surface of the outer panel, and a connection vertical wall that connects an inner peripheral vertical wall configuring an inner periphery of the outer peripheral frame and the proximate surface. The inner peripheral vertical wall and the connection vertical wall form a front-side vertical wall which extends in a vehicle width direction at a vehicle front side portion of the proximate surface, and form lateral-side vertical walls which extend in a front and rear direction of a vehicle at both side portions of the proximate surface in the vehicle width direction. The lateral-side vertical wall is formed to have a stepped shape including a flat surface, and an area of the flat surface becomes smaller as a measurement position of the area gets closer to the front-side vertical wall.

(2) In the vehicle hood structure (1), the flat surface is disposed at a proximate surface side compared to a center of the lateral-side vertical wall in the vehicle width direction.

(3) In the vehicle hood structure (1) or (2), a first through hole is formed in the flat surface.

(4) In the vehicle hood structure (3), the first through hole includes a connection portion connecting the proximate surface and the lateral-side vertical wall.

(5) In any one of the vehicle hood structures (1) to (4), a second through hole is formed in a connection portion connecting the front-side vertical wall and the lateral-side vertical wall, and a terminal end of the flat surface is connected with the second through hole.

(6) In any one The vehicle hood structures (1) to (5), the inner peripheral vertical wall and the connection vertical wall form a rear-side vertical wall which extends in the vehicle width direction at a vehicle rear side portion of the proximate surface, and the flat surface is formed continuous with the lateral-side vertical wall and the rear-side vertical wall.

According to the invention (1) described above, the lateral-side vertical wall is formed to have the stepped shape having the flat surface, thereby having a plurality of the bend points. Thus, in a case where the load is input to the portion of the hood outer panel above the lateral-side vertical wall, the lateral-side vertical wall is easily deformed so that the impact absorption performance is secured advantageously.

In addition, the flat surface of the lateral-side vertical wall is formed such that the area thereof becomes smaller as a measurement position of the area gets closer to the front-side vertical wall. Therefore, since the impact absorption performance of the lateral-side vertical wall is improved, the deformation easily occurs with respect to the input of the load between the lateral-side vertical wall and the front-side vertical wall, that is, the impact absorption performance can be uniform, so that the impact absorption performance is improved in the entire hood outer panel.

According to the invention (2) described above, since the bend point of the lateral-side vertical wall is arranged in a portion close to the proximate surface, in a case where the load is input to the portion of the hood outer panel above the lateral-side vertical wall, the lateral-side vertical wall is immediately deformed to absorb the impact. Thus, the impact absorption performance is secured advantageously.

According to the invention (3) described above, since the first through hole is formed in the flat surface, in a case where the load of the impactor is input to the portion of the hood outer panel above the lateral-side vertical wall, the impact absorption performance can be secured.

According to the invention (4) described above, the first through hole includes the connection portion connecting the proximate surface and the lateral-side vertical wall in addition to the flat surface, and many bend points are included in the through hole. Thus, in a case where the load of the impactor is input to the portion of the hood outer panel above the lateral-side vertical wall, the impact absorption performance can be secured.

According to the invention (5) described above, since the second through hole is formed in the connection portion connecting the lateral-side vertical wall and the front-side vertical wall, in a case where the load is input to the hood outer panel above the vicinity of the connection portion, the rigidity of the corner between the lateral-side vertical wall and the front-side vertical wall is reduced so that the deformation is promoted. Accordingly, the impact absorption performance is secured advantageously.

According to the invention (6) described above, since the flat surface is formed continuously from the lateral-side vertical wall to the rear-side vertical wall to make the bend points, in a case where the load is input to the hood outer panel above the vicinity of the connection portion connecting the lateral-side vertical wall and the rear-side vertical wall, the rigidity of the corner between the lateral-side vertical wall and the rear-side vertical wall is reduced to promote the deformation. Accordingly, the impact absorption performance is secured advantageously.

DETAILED DESCRIPTION OF THE EMBODIMENTS

Hereinafter, an embodiment of the present invention will be described with reference to the drawings.

A vehicle has a front-side compartment partitioned by a dash panel on a front side of a vehicle cabin. In the front-side compartment, an inverter is arranged in a case where the vehicle is an electric motor car, and a radiator and an engine are arranged in a case where the vehicle has an internal-combustion engine as a driving source.

A hood is for opening and closing the front-side compartment. The rear end of the hood is retatably fixed to the vehicle body through a hinge (not illustrated) to be openable and closable.

A first embodiment will be described with reference to FIGS. 1A to 3. In FIGS. 1A to 3, a reference numeral FR indicates a vehicle front direction, a reference numeral UP indicates a vehicle upper direction, and a reference numeral HL indicates the vehicle width direction.

Figure 1A:
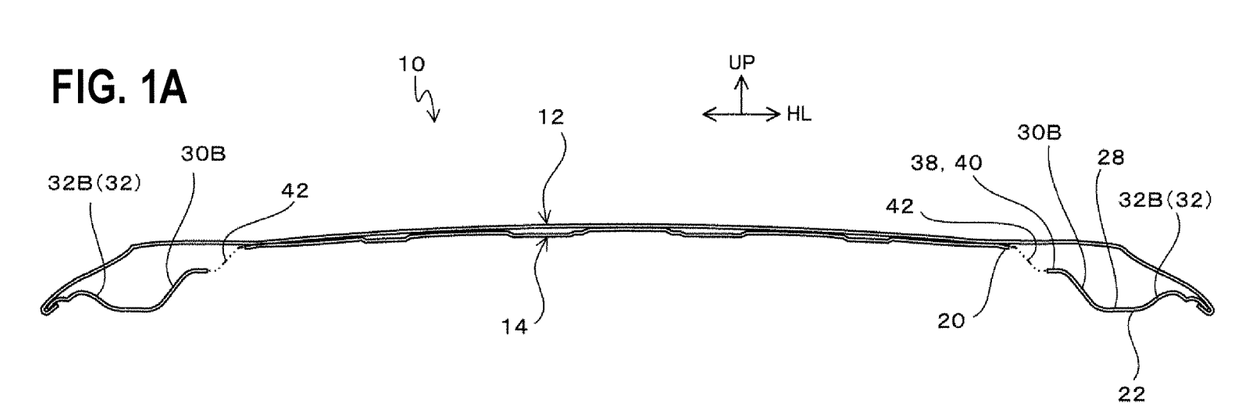
FIG. 1A is a sectional view of a hood according to a first embodiment when cut along a width direction of a vehicle.
Figure 1B:
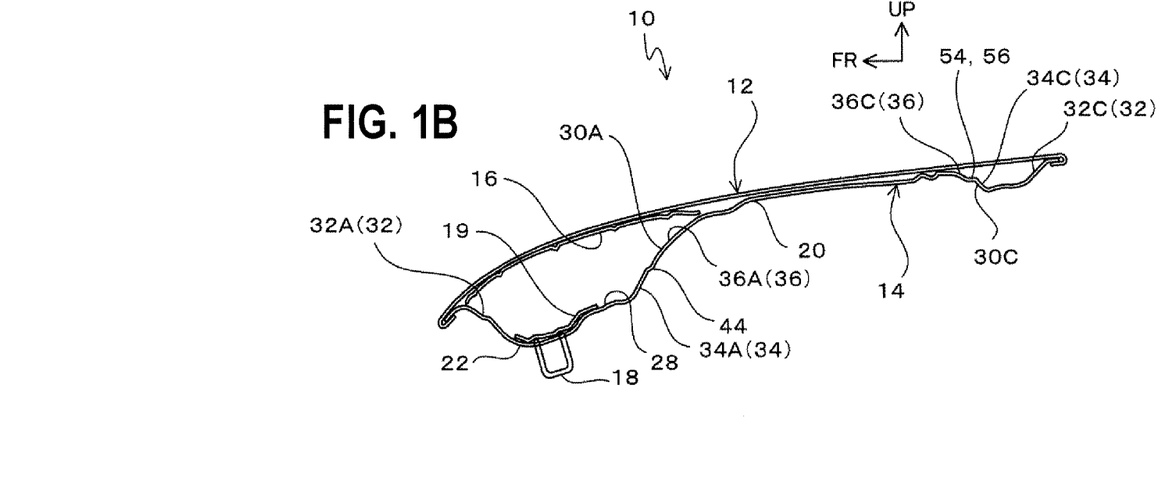
FIG. 1B is a sectional view of the hood according to the first embodiment when cut along a front rear direction of the vehicle.
Figure 2:
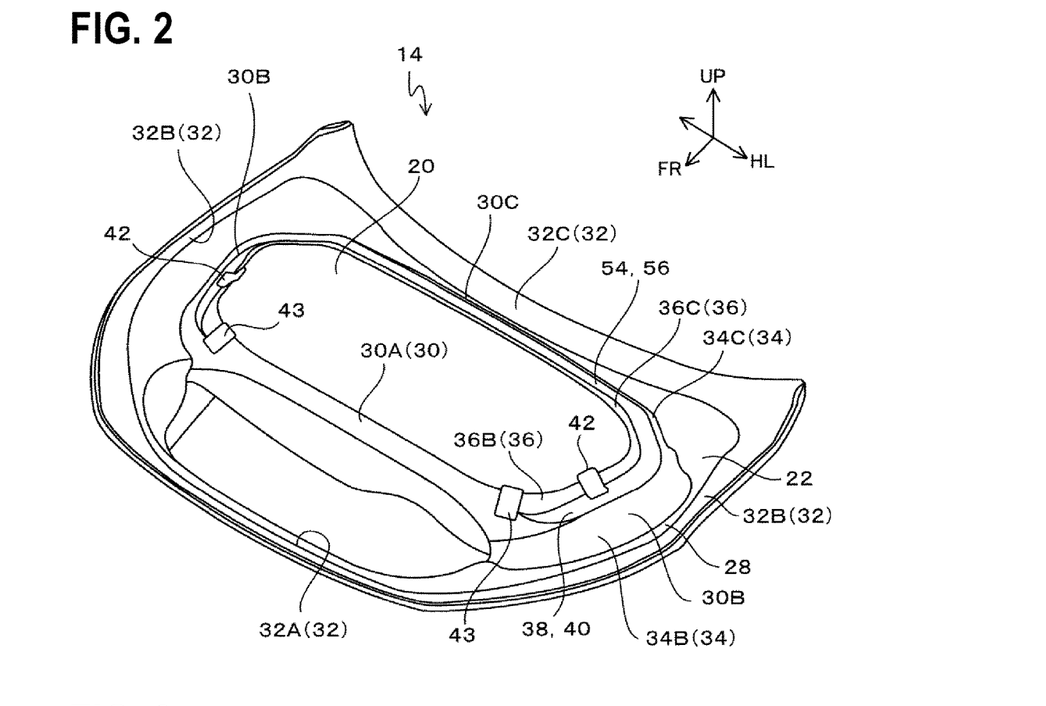
FIG. 2 is a perspective view of a hood inner panel of the hood when viewed from a hood outer panel side.

A hood 10 includes a hood outer panel 12, a hood inner panel 14, a hood lock reinforce 16, a striker 18, and a striker reinforce 19.

The hood outer panel 12 forms a surface on a vehicle outside.

The hood inner panel 14 includes a proximate surface 20, an outer peripheral frame 22, and a connection vertical wall 36.

The outer peripheral frame 22 is a portion which is arranged in the outer peripheral portion of the back surface of the hood outer panel 12. The entire circumference of the outer edge of the outer peripheral frame 22 is joined to the entire outer circumference of the hood outer panel 12 by hemming.

The outer peripheral frame 22 has a bottom wall 28, an outside erection wall 32 which is erected from the outer circumference of the bottom wall 28, and an inner peripheral vertical wall 34 which is erected from the inner periphery of the bottom wall 28, thereby having a shape which is recessed upward.

The bottom wall 28 is positioned in the intermediate portion of the outer peripheral frame 22, and extends annularly in the vicinity of the proximate surface 20.

The bottom wall 28 is disposed at a most-distant portion of the outer peripheral frame 22 from the hood outer panel 12.

The outside erection wall 32 is erected from the portion of the bottom wall 28 near the outer edge of the outer peripheral frame 22.

The outside erection wall 32 is connected with the outer edge of the outer peripheral frame 22, and the outside erection wall 32 extends annularly between the bottom wall 28 and the outer edge of the outer peripheral frame 22.

The outside erection wall 32 includes a front-side outside erection wall 32A which is positioned on the vehicle front side and extends in the vehicle width direction, a pair of lateral-side outside erection walls 32B which are positioned on both sides in the vehicle width direction and extends in the front and rear direction of the vehicle, and a rear-side outside erection wall 32C which is positioned on the vehicle rear side and extends in the vehicle width direction.

Figure 3:
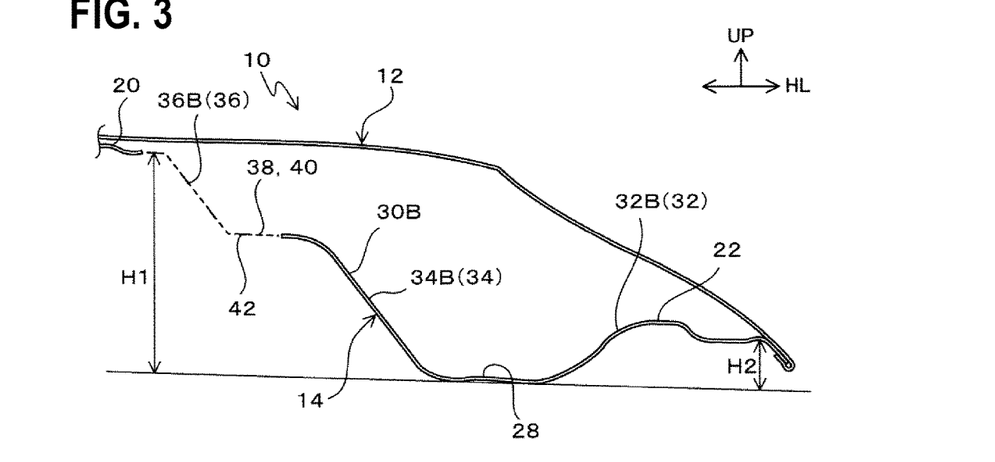
FIG. 3 is a sectional view of the hood when cut along the width direction of a vehicle, and is a partially enlarged view of an outer peripheral frame and a vertical wall.
Figure 4A:
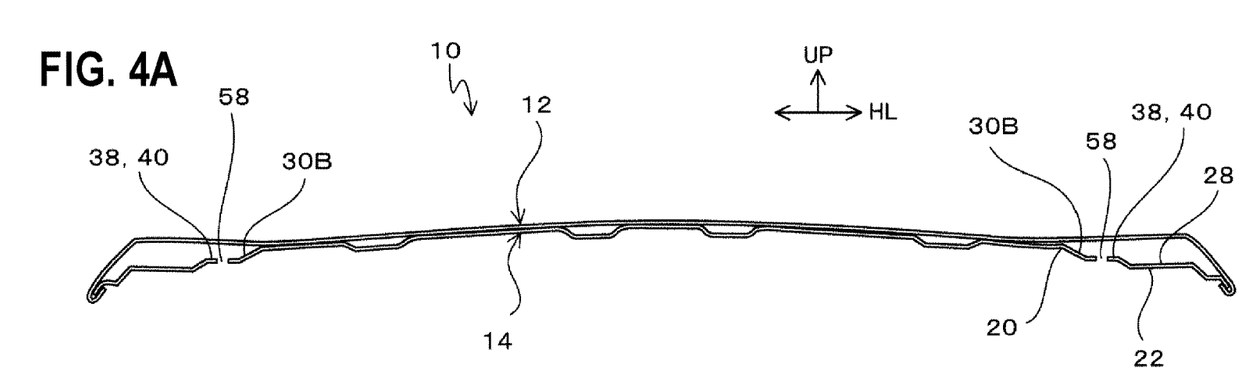
FIG. 4A is a sectional view of a hood according to a second embodiment when cut along the width direction of the vehicle.
Figure 4B:
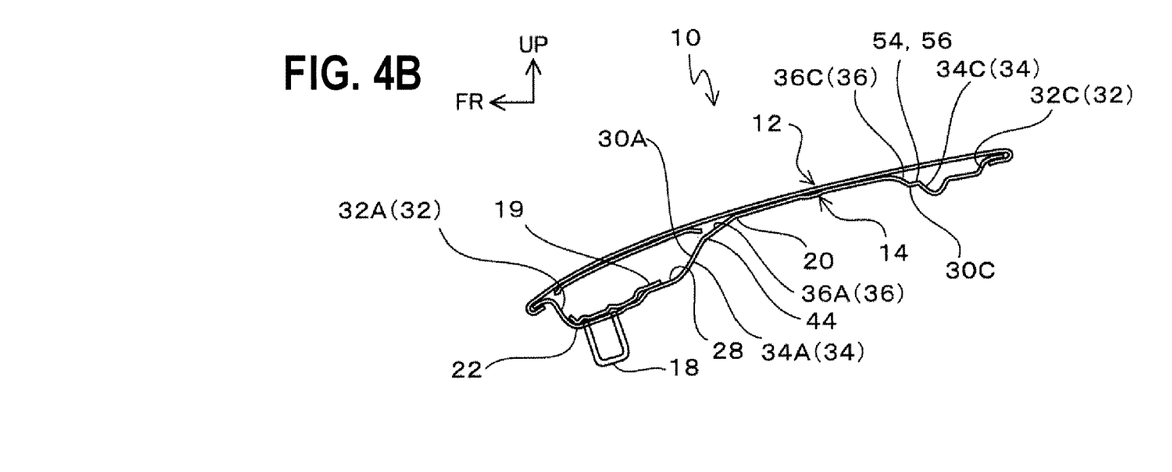
FIG. 4B is a sectional view of the hood according to the second embodiment when cut along the front and rear direction of the vehicle.

As illustrated in FIG. 3, a slant of the lateral-side outside erection walls 32B is gentle compared to a slant of a lateral-side vertical wall 30B (to be described later), and a height H2 of the lateral-side outside erection walls 32B from the bottom wall 28 is formed to have a smaller dimension than a height H1 of the lateral-side vertical wall 30B from the bottom wall 28. A desired impact absorption performance is provided near the outer peripheral portion of the hood outer panel 12 in which the impact absorption performance tends to become low.

The proximate surface 20 is a portion which is joined to the inner peripheral portion of the back surface of the hood outer panel 12, and is arranged inside the outer peripheral frame 22.

A plurality of portions in the proximate surface 20 are joined to the back surface of the hood outer panel 12 by a mastic joint.

The connection vertical wall 36 connects the outer circumference of the proximate surface 20 and the inner peripheral vertical wall 34. Therefore, the upper end of the connection vertical wall 36 is connected with the proximate surface 20, and the lower end of the connection vertical wall 36 is connected with the upper end of the inner peripheral vertical wall 34.

The striker 18 is arranged in a portion near the front end at the center of the hood inner panel 14 in the vehicle width direction, and specifically is provided in the front end of the bottom wall 28 and which is positioned on the front side of the vehicle at the center in the vehicle width direction.

When described in detail, the striker 18 is mounted in the lower surface of the striker reinforce 19 by welding, and the striker reinforce 19 in which the striker 18 is mounted is welded on the upper surface of the bottom wall 28. At that time, the striker 18 is arranged to protrude to the lower side of the bottom wall 28 through a hole part provided in the bottom wall 28.

The striker 18 is arranged at the center of the hood lock reinforce 16 in the vehicle width direction.

In addition, the hood lock reinforce 16 is arranged above the striker 18. The front and rear portions of the hood lock reinforce 16 are joined to the hood inner panel 14, and the intermediate portion of the hood lock reinforce 16 is joined by mastic to the hood outer panel 12.

As one example, a structure in which the striker reinforce 19 is mounted in the hood inner panel 14 in a state where the striker 18 is welded in the striker reinforce 19 arranged above the hood inner panel 14 has been described. However, a mounting structure of the striker 18 is not limited thereto, and various mounting methods such as a structure in which the striker reinforce 19 is mounted in the lower surface of the hood inner panel 14 by welding or bolting, and the striker 18 is mounted in the striker reinforce 19 may be adopted. Similarly, also in the arrangement of the striker 18, the striker 18 may be arranged to be deviated from the center of the hood 10 in the vehicle width direction.

The inner peripheral vertical wall 34 and the connection vertical wall 36 extend annularly along the vicinity of the proximate surface 20 between the proximate surface 20 and the bottom wall 28.

The inner peripheral vertical wall 34 and the connection vertical wall 36 form a front-side vertical wall 30A, a pair of the lateral-side vertical walls 30B, and a rear-side vertical wall 30C.

The front-side vertical wall 30A is positioned on the vehicle front side of the proximate surface 20 and extends in the vehicle width direction.

The pair of the lateral-side vertical walls 30B are positioned on both sides of the proximate surface 20 in the vehicle width direction and extend in the front and rear direction of the vehicle.

The rear-side vertical wall 30C is positioned on the vehicle rear side of the proximate surface 20 and extends in the vehicle width direction.

The lateral-side vertical wall 30B is formed such that an inner peripheral vertical wall 34B and a connection vertical wall 36B which extend in the front and rear direction of the vehicle are connected with each other through a flat surface 38 which extends in a horizontal direction in the front and rear direction of the vehicle, and have a stepped shape in an erecting direction of the lateral-side vertical wall 30B.

The flat surface 38 is formed by an intermediate wall 40 which has a width in the vehicle width direction and extends in the front and rear direction of the vehicle, so that the lateral-side vertical wall 30B is deformed easily.

In the vehicle width direction, the flat surface 38 is positioned in a portion which is deviated to the proximate surface 20 side from the center of the lateral-side vertical wall 30B in the vehicle width direction.

The area of the flat surface 38 is formed to become smaller from the lateral-side vertical wall 30B toward the front-side vertical wall 30A.

A first through hole 42 for improving the impact absorption efficiency is penetratingly formed in a portion which is positioned in the intermediate portion of the lateral-side vertical wall 30B in the front and rear direction.

The first through hole 42 is provided over the intermediate wall 40, the connection vertical wall 36B near the proximate surface 20 in the inner peripheral vertical wall 34B and the connection vertical wall 36B, and a connection portion connecting the proximate surface 20 and the connection vertical wall 36B.

In addition, a second through hole 43 for improving the impact absorption efficiency is penetratingly formed in the connection portion connecting the front-side vertical wall 30A and the lateral-side vertical wall 30B.

The terminal end of the flat surface 38 is connected with the second through hole 43.

In addition, as illustrated in FIGS. 1A and 1B, the front-side vertical wall 30A is erected at a gentle slant compared to the lateral-side vertical wall 30B, and a desired impact absorption performance with respect to the impactor of the portion of the hood outer panel 12 above the front-side vertical wall 30A is provided.

That is, the front-side vertical wall 30A is formed by an inner peripheral vertical wall 34A and a connection vertical wall 36A which are connected through a bent portion 44. A slant angle of the inner peripheral vertical wall 34A and the connection vertical wall 36A has a gentle value compared to the slant angle of the inner peripheral vertical wall 34B and the connection vertical wall 36B configuring the lateral-side vertical wall 30B, and the impact absorption performance with respect to the impactor of the portion of the hood outer panel 12 above the front-side vertical wall 30A is secured.

As illustrated in FIG. 1B, the rear-side vertical wall 30C is formed such that an inner peripheral vertical wall 34C and a connection vertical wall 36C which extend in the vehicle width direction are connected in an erecting direction of the rear-side vertical wall 30C through the flat surface 54 extending in the horizontal direction.

The flat surface 54 is formed in a shape continuous with the flat surface 38 of the lateral-side vertical wall 30B.

The flat surface 54 includes an intermediate wall 56 which has a width in a direction to be intersected with the inner peripheral vertical wall 34C and the connection vertical wall 36C and extends in the vehicle width direction, so that the rear-side vertical wall 30C is deformed easily.

Next, the description will be given about an operational effect.

In a pedestrian protection performance test on the hood 10, the impact absorption performance is evaluated in such a manner that the impactor is allowed to collide with the hood 10 from the upper side of the vehicle in an oblique rear direction.

In a case where the load of the impactor is input to the portion of the hood outer panel 12 above the front-side vertical wall 30A, in consideration of the input direction of the load and the extending direction of the front-side vertical wall 30A, the load is received by a surface of the front-side vertical wall 30A. For this reason, the front-side vertical wall 30A is easily deformed along the input direction of the load, and the impact absorption performance is secured easily.

In this embodiment, the front-side vertical wall 30A is erected at a gentle slant compared to the lateral-side vertical wall 30B, the load is easily received by the surface of the front-side vertical wall 30A, and the front-side vertical wall 30A is easily deformed along the input direction of the load, so that the impact absorption performance is secured more easily.

On the other hand, in a case where the load of the impactor is input to the portion of the hood outer panel 12 above the lateral-side vertical wall 30B, in consideration of the input direction of the load and the extending direction of the lateral-side vertical wall 30B, the load is received by a line along the extending direction of the lateral-side vertical wall 30B. For this reason, the lateral-side vertical wall 30B is hardly deformed along the input direction of the load, and the impact absorption performance is hardly secured.

In this embodiment, the lateral-side vertical wall 30B is formed in the stepped shape having the flat surface 38, and includes a plurality of bend points. For this reason, in a case where the load is input to the portion of the hood outer panel 12 above the lateral-side vertical wall 30B, the lateral-side vertical wall 30B is easily deformed, so that the impact absorption performance is secured advantageously.

In addition, the flat surface 38 of the lateral-side vertical wall 30B is formed such that the area thereof becomes smaller as a measurement position of the area gets closer to the front-side vertical wall 30A. For this reason, the impact absorption performance of the lateral-side vertical wall 30B is improved. Thus, the deformation easily occurs with respect to the input of the load between the lateral-side vertical wall 30B and the front-side vertical wall 30A, that is, the impact absorption performance can be uniform, so that the impact absorption performance is improved in the entire hood outer panel 12.

In addition, since the bend point of the lateral-side vertical wall 30B is arranged in a portion close to the proximate surface 20, in a case where the load is input to the portion of the hood outer panel 12 above the lateral-side vertical wall 30B, the lateral-side vertical wall 30B is immediately deformed to absorb the impact. Thus, the impact absorption performance is secured more advantageously.

Since the first through hole 42 is provided in the flat surface 38, in a case where the load of the impactor is input to the portion of the hood outer panel 12 above the lateral-side vertical wall 30B, the deformation of the flat surface 38 is promoted so that the lateral-side vertical wall 30B is deformed more easily.

For this reason, in a case where the load of the impactor is input to the portion of the hood outer panel 12 above the lateral-side vertical wall 30B, the impact absorption performance is secured more advantageously.

In addition, the first through hole 42 includes the connection portion connecting the proximate surface 20 and the lateral-side vertical wall 30B in addition to the flat surface 38, and many bend points are included in the first through hole 42. Thus, in a case where the load of the impactor is input to the portion of the hood outer panel 12 above the lateral-side vertical wall 30B, the lateral-side vertical wall 30B is immediately deformed to absorb the impact, so that the impact absorption performance is secured more advantageously.

In addition, since the second through hole 43 is formed in the connection portion connecting the lateral-side vertical wall 30B and the front-side vertical wall 30A, in a case where the load is input to the hood outer panel 12 above the vicinity of the connection portion connecting the lateral-side vertical wall 30B and the front-side vertical wall 30A, the rigidity of the corner between the lateral-side vertical wall 30B and the front-side vertical wall 30A is reduced so that the deformation is promoted. Accordingly, the impact absorption performance is secured advantageously.

Even in a case where the load of the impactor is input to the portion of the hood outer panel 12 above the rear-side vertical wall 30C, in consideration of the input direction of the load and the extending direction of the rear-side vertical wall 30C, the load is received by a line along the extending direction of the rear-side vertical wall 30C. For this reason, the rear-side vertical wall 30C is hardly deformed along the input direction of the load, and the impact absorption performance is hardly secured.

In this embodiment, the rear-side vertical wall 30C is formed such that the inner peripheral vertical wall 34C and the connection vertical wall 36C are connected through the flat surface 54. The flat surface 54 has a width in a direction to be intersected with the inner peripheral vertical wall 34C and the connection vertical wall 36C and extends in the vehicle width direction, and the rear-side vertical wall 30C has a plurality of bend points.

Therefore, in a case where the load of the impactor is input to the portion of the hood outer panel 12 above the rear-side vertical wall 30C, the rear-side vertical wall 30C is deformed easily.

For this reason, even in a case where the load of the impactor is input to the portion of the hood outer panel 12 above the rear-side vertical wall 30C, the impact absorption performance is secured still more advantageously.

In addition, since the flat surfaces 38 and 54 are formed continuously from the lateral-side vertical wall 30B to the rear-side vertical wall 30C so as to make the bend points continuously, in a case where the load is input to the hood outer panel 12 above the vicinity of the connection portion connecting the lateral-side vertical wall 30B and the rear-side vertical wall 30C, the rigidity of the corner between the lateral-side vertical wall 30B and the rear-side vertical wall 30C is reduced to promote the deformation. Accordingly, the impact absorption performance is secured advantageously.

The slant of the lateral-side outside erection walls 32B becomes gentle compared to the slant of the lateral-side vertical wall 30B. As a result, the height H2 of the lateral-side outside erection walls 32B from the bottom wall 28 is formed to have smaller dimension than the height H1 of the lateral-side vertical wall 30B from the bottom wall 28.

For this reason, the impact absorption performance is advantageously secured near the outer peripheral portion of the hood outer panel 12 in which the impact absorption performance tends to become low.

In this manner, even in case where the load of the impactor is input to the portion of the hood outer panel 12 above any one of the front-side vertical wall 30A, the lateral-side vertical wall 30B, the rear-side vertical wall 30C, and the lateral-side outside erection walls 32B, the impact absorption performance is secured advantageously.

Next, a second embodiment will be described with reference to FIGS. 4A to 6.

The same portions and members as those in the first embodiment are denoted by the same reference numerals, and the description will focus on portions different from those in the first embodiment.

Figure 5:
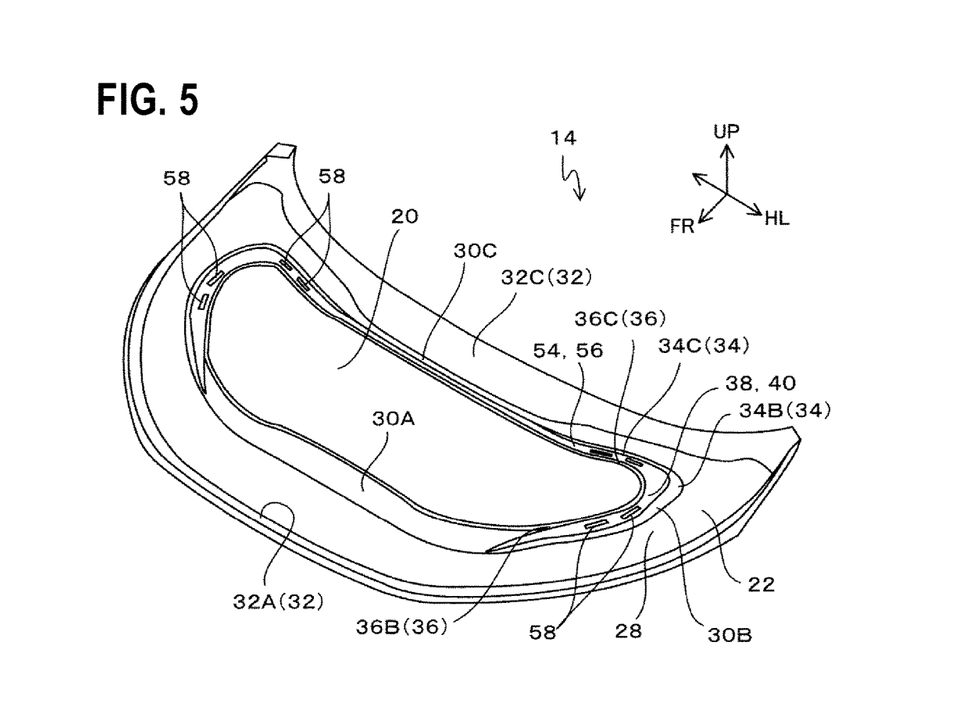
FIG. 5 is a perspective view of the hood inner panel of the hood when viewed from the hood outer panel side.
Figure 6:
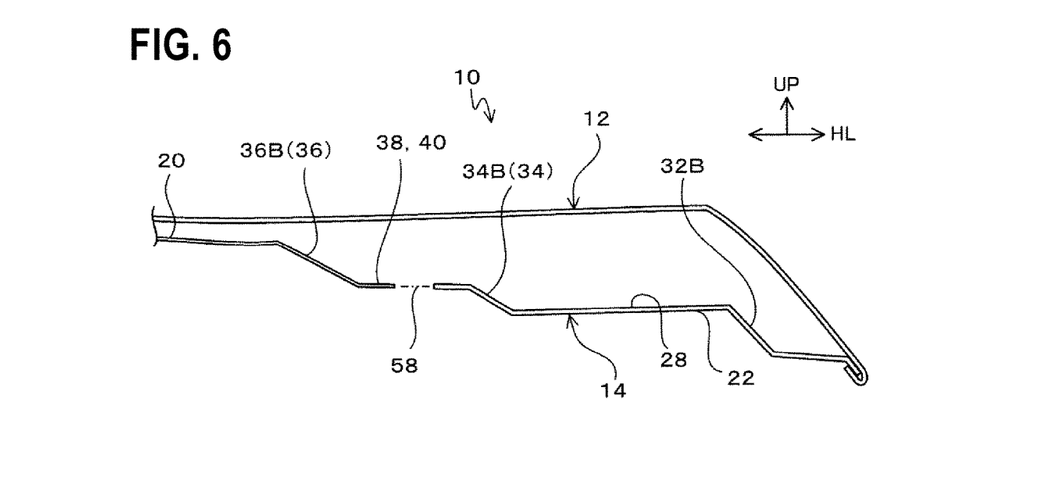
FIG. 6 is a sectional view of the hood when cut along the width direction of the vehicle, and is a partially enlarged view of the outer peripheral frame and the vertical wall.

In the second embodiment, a shape of a third through hole 58 which is provided in the intermediate wall 40 and is intended to improve the impact absorption efficiency is different from that in the first embodiment.

That is, in the second embodiment, the third through hole 58 is formed only in the flat surface 38 (intermediate wall 40), and does not extend in the connection vertical wall 36.

In addition, the lateral-side outside erection walls 32B is formed at such a slant that is deviated downward to the outside in the vehicle width direction.

In the second embodiment, the same effect is given as that in the first embodiment.

What is claimed is:

1. A vehicle hood structure comprising:
   a hood outer panel; and
   a hood inner panel that is disposed at a back surface of the hood outer panel, wherein the hood inner panel includes:
     an outer peripheral frame that is arranged in an outer peripheral portion of the hood inner panel;
     a proximate surface that is arranged inside from the outer peripheral frame and is joined to the back surface of the outer panel; and
     a connection vertical wall that connects an inner peripheral vertical wall configuring an inner periphery of the outer peripheral frame and the proximate surface,
   the inner peripheral vertical wall and the connection vertical wall form a front-side vertical wall which extends in a vehicle width direction at a vehicle front side portion of the proximate surface, and form lateral-side vertical walls which extend in a front and rear direction of a vehicle at both side portions of the proximate surface in the vehicle width direction,
   each of the lateral-side vertical walls is formed to have a stepped shape including a flat surface, and
   a width of the flat surface between the inner peripheral vertical wall and the connection vertical wall becomes smaller as the flat surface extends closer to the front-side vertical wall.

2. The vehicle hood structure according to claim 1, wherein
   the flat surface is disposed at a proximate surface side compared to a center of the lateral-side vertical wall in the vehicle width direction.

3. The vehicle hood structure according to claim 1, wherein
   a first through hole is formed in the flat surface.

4. The vehicle hood structure according to claim 3, wherein
   the first through hole includes a connection portion connecting the proximate surface and a lateral-side vertical wall.

5. The vehicle hood structure according to claim 3, wherein
   a second through hole is formed in a connection portion connecting the front-side vertical wall and the lateral-side vertical wall, and
   a terminal end of the flat surface is connected with the second through hole.

6. The vehicle hood structure according to claim 1, wherein
   the inner peripheral vertical wall and the connection vertical wall form a rear-side vertical wall which extends in the vehicle width direction at a vehicle rear side portion of the proximate surface, and
   the flat surface is formed continuous with the lateral-side vertical wall and the rear-side vertical wall.

7. The vehicle hood structure according to claim 1, wherein
   a through hole is formed in a connection portion connecting the front-side vertical wall and the lateral-side vertical wall, and
   a terminal end of the flat surface is connected with the through hole.

* * * * *